United States Patent
Sumio

(10) Patent No.: US 7,590,857 B2
(45) Date of Patent: Sep. 15, 2009

(54) SECURE DATA PROCESSING FOR IMAGE FORMING APPARATUS

(75) Inventor: Hiroshi Sumio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 11/181,766

(22) Filed: Jul. 15, 2005

(65) Prior Publication Data

US 2006/0026437 A1    Feb. 2, 2006

(30) Foreign Application Priority Data

Jul. 29, 2004    (JP) .............................. 2004-221954

(51) Int. Cl.
*G06F 21/00* (2006.01)
(52) U.S. Cl. .......................................... 713/183; 726/5
(58) Field of Classification Search .................. 713/183; 726/3, 5
See application file for complete search history.

(56) References Cited

U.S. PATENT DOCUMENTS

| | | | |
|---|---|---|---|
| 6,654,135 B2 | 11/2003 | Mitani | |
| 7,033,091 B2* | 4/2006 | Nakao | 400/76 |
| 7,145,679 B2 | 12/2006 | Hitaka | |
| 7,215,437 B2* | 5/2007 | Shima | 358/1.15 |
| 7,308,572 B2* | 12/2007 | Goh et al. | 713/152 |
| 7,433,868 B1 | 10/2008 | Satomi et al. | |
| 2002/0135816 A1* | 9/2002 | Ohwa | 358/474 |
| 2002/0147646 A1* | 10/2002 | Ogura et al. | 705/14 |
| 2003/0002077 A1* | 1/2003 | Shima | 358/1.15 |
| 2003/0099353 A1* | 5/2003 | Goh et al. | 380/51 |
| 2004/0213615 A1* | 10/2004 | Nakao | 400/76 |
| 2006/0021013 A1* | 1/2006 | Kinoshita | 726/6 |
| 2006/0061803 A1* | 3/2006 | Oka | 358/1.15 |

FOREIGN PATENT DOCUMENTS

JP    2002-215361    8/2002

* cited by examiner

*Primary Examiner*—David García Cervetti
(74) *Attorney, Agent, or Firm*—Fitzpatrick, Cella, Harper & Scinto

(57) ABSTRACT

When transferred data is registered, it is determined whether access to the registered data is or is not protected by a password. If it is determined that a password is necessary, an inquiry is made to the registration request side, as to whether or not registration processing is to be continued. If a response of agreeing to the registration is received, registration processing is continued, while if a response of not agreeing to the registration is received, the registration processing is stopped. When a request of outputting registered data is received, it is determined whether or not password is necessary to output the registered data. If it is determined that password is necessary, password input is requested to an output request side. If a password inputted by the output request side is correct output processing is continued, while if the password is not correct, the output processing is stopped.

14 Claims, 15 Drawing Sheets

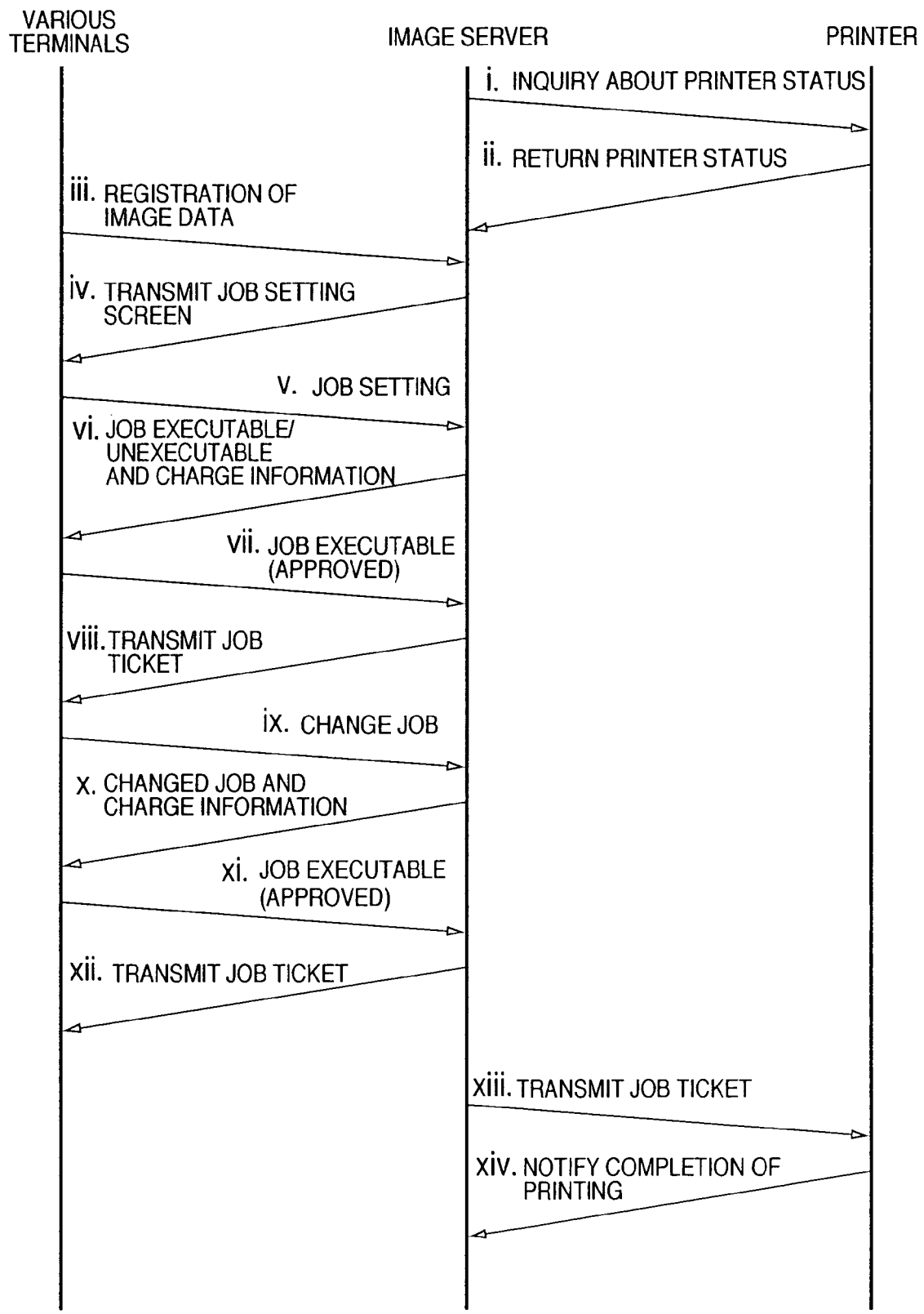

FIG. 6

| INQUIRY UPON PRINTER START-UP TIME | INQUIRY BY PREDETERMINED PERIOD |
|---|---|
| PRINTER MODEL<br>PAPER SIZE<br>RESOLUTION<br>MONOCHROME/COLOR<br>PRINT SPEED<br>PHYSICAL PRINTER POSITION<br>PRINTER LANGUAGE<br>PRINTER FONT<br>STAPLE FUNCTION<br>PUNCH FUNCTION<br>BOOK BINDING FUNCTION<br>NIN1 FUNCTION<br>DOUBLE SIDE FUNCTION | PRINTER STATUS<br>REMAINING PAPER AMOUNT<br>REMAINING TONER AMOUNT<br>REMAINING MEMORY CAPACITY<br>REMAINING STAPLE AMOUNT |

61 / 62

F I G. 7

| SERIAL NO | USER ID | DOCUMENT ID | JOB ID | RELATED INFORMATION | RECEPTION TIME | OUTPUT TIME LIMIT |
|---|---|---|---|---|---|---|
| 1 | 12345 | 0001 | 000001 | A4, 5 PAGES, 5 COPIES, COLOR | 2000/9/26 11:55 | 2000/10/6 19:00 |
| 2 | 23456 | 0002 | 000002 | A4, 3 PAGES, 1 COPY, COLOR | 2000/9/26 14:00 | 2000/9/28 15:00 |
| 3 | 12345 | 0003 | 000003 | A4, 22 PAGES, 1 COPY, MONOCHROME&COLOR | 2000/9/27 10:11 | 2000/9/27 15:00 |
| 4 | 77777 | 0004 | 000004 | POSTCARD, 1 PAGE, 15 COPIES, COLOR | 2000/9/27 11:00 | 2000/9/28 12:30 |
| 5 | 12111 | 0005 | 000005 | A3, 3 PAGES, 3 COPIES, MONOCHROME | 2000/9/28 18:00 | 2000/9/29 8:30 |

FIG. 8

ID DOCUMENT ID : __0001__
OUTPUT COPIES: _5_ COPIES          ○ TEST PRINT
PRINT TYPE :   ○ MONOCHROME ○ COLOR ○ MONOCHROME AND COLOR

FINISH :  ○ SINGLE-SIDED  ○ DOUBLE-SIDED  ○ 2IN1  ○ 4IN1

SIZE :  ○ A3  ○ B4  ○ A4  ○ B5  ○ POSTCARD

PAPER TYPE :  ○ NORMAL  ○ BOLD  ○ COATED

BINDING :  ○ CASE BINDING  ○ SADDLE STITCH  ○ TWO-FOLD  ○ Z-FOLD

   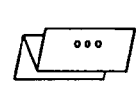

○ STAPLE          ○ TWO-POSITION STAPLE     ○ PUNCH

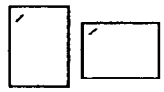 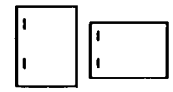 

RESOLUTION :  ○ 200DPI  ○ 400DPI  ○ 600DPI  ○ 1200DPI

OUTPUT DATE AND TIME :  _2000_ 年 _10_ 月 _6_ 日 _19_ 時 _00_ 分

OUTPUT PLACE : CANOPRINT SHOP SHIMOMARUKO

FIG. 9

DOCUMENT ID : 0001
ORIGINAL PAGES: 5
COPIES: 5
SIZE: 4A
OUTPUT PAPER: NORMAL
BINDING: STAPLE
RESOLUTION : 600DPI
OUTPUT DATE AND TIME : 2000/10/6 19:00
OUTPUT PLACE : CANOPRINT SHOP SHIMOMARUKO
CHARGE: 1600 YEN

PRINT :  ○  OK  ○  CANCEL
JOB CHANGE :  ○  YES  ○  NO

FIG. 10

DOCUMENT NAME : MEETINGMEMO.doc

INPUT PASSWORD

| | OK |

SECURE DATA PROCESSING FOR IMAGE FORMING APPARATUS

FIELD OF THE INVENTION

The present invention relates to information processing method, and system and apparatus thereof capable of temporarily storing data and reading necessary data by designating the data in accordance with necessity. More particularly, the present invention relates to processing of data with password for security.

BACKGROUND OF THE INVENTION

Conventionally known is a print system in which a document is uploaded from a client computer to a print server via the Internet and the document uploaded in the print server is print-outputted. The service provided by the system is becoming popular as a print service. As an example of this type of system, known is a print system in which image data is registered in a server, the image data in the server is designated from a client device, then the designated image data is transferred to a printer and print-outputted (e.g., Japanese Patent Application Laid-Open No. 2002-215361).

In the above conventional system, a generated document is received by a specialized printer driver. Further, systems capable of handling Jpeg files and PDF files as standard formats are known. However, in a case where registered data itself is protected with a password, when the registered data is actually print-outputted, a printing error occurs due to the password.

On the other hand, in a system configured without consideration of security of each data, it is necessary to take a security countermeasure for the server itself.

SUMMARY OF THE INVENTION

The present invention provides information processing method, and system and apparatus thereof to solve the inconvenience of the above-described conventional methods and prevent undesired registration of data with password, and further, even when data with password is registered in error, to make it possible to read the data with password, thereby prevent data tamperer in a storage of server and keep secret information even upon data burglary in the server.

To attain the above object, the present invention provides an information processing apparatus for registering transferred data and outputting previously-registered data, based on requests from outside, comprising: registration means for registering transferred data; first determination means for determining whether or not password is necessary to access the transferred data; and notification means for notifying that the transferred data necessary password is to be registered, to a registration request side upon data registration, when the first determination means determines that password is necessary to access the transferred data.

Note that the data includes image data. Further, the notification means includes inquiry means for inquiring whether or not registration processing of the transferred data is to be continued of the registration request side, when the first determination means determines that password is necessary to access the transferred data, and the registration means continues the registration processing, when a response of agreeing to the registration is received from the registration request side, while stops the registration processing, when a response of not agreeing to the registration is received from the registration request side. Further, the information processing apparatus further comprises output means for outputting a registered data in response to a request of outputting the registered data. Further, the information processing apparatus further comprises: second determination means for determining whether or not password is necessary to output a registered data, when a request of outputting the registered data is received from an output request side; and request means for requesting password input to the output request side, when the second determination means determines that password is necessary to output the registered data. Further, the information processing apparatus further comprises third determination means for determining whether or not a password inputted from the output request side is correct, and wherein the output means, upon output of registered data necessary password, continues output processing when a password inputted from the output request side is correct, while stops the output processing when the password is not correct. Further, the request means, when the second determination means determines that password is necessary to output a registered data, displays at least one of name of the registered data to be outputted, name of server holding the registered data, name of user who registered the data, account name of data registration, date of registration, and time of registration, on the output request side, and then enables the password input from the output request side.

Further, the present invention provides an information processing method for registering transferred data and outputting previously-registered data, based on requests from outside, comprising: a first determination step of determining whether or not password is necessary to access the transferred data; a notification step of notifying that the transferred data necessary password is to be registered, to a registration request side upon data registration, when it is determined that password is necessary to access the transferred data in the first determination step, the notification step including an inquiry step of inquiring whether or not registration processing of the transferred data is to be continued of the registration request side; and a registration step of continuing the registration processing, when a response of agreeing to the registration is received from the registration request side, while stopping the registration processing, when a response of not agreeing to the registration is received from the registration request side. Further, the information processing method further comprises: a second determination step of determining whether or not password is necessary to output a registered data, when a request of outputting the registered data is received from an output request side; a request step of requesting password input to the output request side, when it is determined that password is necessary to output the registered data in the second determination step; a third determination step of determining whether or not a password inputted from the output request side is correct; and an output step of continuing output processing when a password inputted from the output request side is correct, while stopping the output processing when the password is not correct.

Further, the present invention provides a computer-executable program for registering transferred data and outputting previously-registered data, based on requests from outside, comprising: a first determination step of determining whether or not password is necessary to access the transferred data; a notification step of notifying that the transferred data necessary password is to be registered, to a registration request side upon data registration, when it is determined that password is necessary to access the transferred data in the first determination step, the notification step including an inquiry step of inquiring whether or not registration processing of the transferred data is to be continued of the registration request side;

a registration step of continuing the registration processing, when a response of agreeing to the registration is received from the registration request side, while stopping the registration processing, when a response of not agreeing to the registration is received from the registration request side; a second determination step of determining whether or not password is necessary to output a registered data, when a request of outputting the registered data is received from an output request side; a request step of requesting password input to the output request side, when it is determined that password is necessary to output the registered data in the second determination step; a third determination step of determining whether or not a password inputted from the output request side is correct; and an output step of continuing output processing when a password inputted from the output request side is correct, while stopping the output processing when the password is not correct.

Further, the present invention provides a storage medium storing a computer-readable program for registering transferred data and outputting previously-registered data, based on requests from outside, the information processing program comprising: a first determination step of determining whether or not password is necessary to access the transferred data; a notification step of notifying that the transferred data necessary password is to be registered, to a registration request side upon data registration, when it is determined that password is necessary to access the transferred data in the first determination step, the notification step including an inquiry step of inquiring whether or not registration processing of the transferred data is to be continued of the registration request side; a registration step of continuing the registration processing, when a response of agreeing to the registration is received from the registration request side, while stopping the registration processing, when a response of not agreeing to the registration is received from the registration request side; a second determination step of determining whether or not password is necessary to output a registered data, when a request of outputting the registered data is received from an output request side; a request step of requesting password input to the output request side, when it is determined that password is necessary to output the registered data in the second determination step; a third determination step of determining whether or not a password inputted from the output request side is correct; and an output step of continuing output processing when a password inputted from the output request side is correct, while stopping the output processing when the password is not correct.

Further, the present invention provides an information processing system for registering transferred data and outputting previously-registered data, based on requests from outside, comprising: first determination means for determining whether or not password is necessary to access the transferred data; notification means for notifying that the transferred data necessary password is to be registered, to a registration request side upon data registration, when the first determination means determines that password is necessary to access the transferred data, the notification means including inquiry means for inquiring whether or not registration processing of the transferred data is to be continued of the registration request side; registration means for continuing the registration processing, when a response of agreeing to the registration is received from the registration request side, while stopping the registration processing, when a response of not agreeing to the registration is received from the registration request side; second determination means for determining whether or not password is necessary to output a registered data, when a request of outputting the registered data is received from an output request side; request means for requesting password input to the output request side, when the second determination means determines that password is necessary to output the registered data; third determination means for determining whether or not a password inputted from the output request side is correct; and output means for continuing output processing when a password inputted from the output request side is correct, while stopping the output processing when the password is not correct.

According to the present invention, the image processing method, and system and apparatus thereof prevent undesired registration of data with password, and further, even when data with password is registered in error, to make it possible to read the data with password, thereby prevent data tamperer in a storage of server and keep secret information even upon data burglary in the server.

That is, upon registration of image data to be outputted, the content of data is discriminated in advance. As a result of discrimination, if it is data with password, a notification that it is data with password is sent to a user who registered the data, and the registration of the data is made cancelable in accordance with necessity. Further, in a case where data with password has been registered, when the data is selected from a second terminal which is used for data selection and output request, a screen prompting a password is displayed. Then, in accordance with an input password, the data can be converted to output data and can be outputted. In this manner, the present invention provides image processing method and its system and apparatus to prevent errors due to inadvertent registration of file with password and missing of password upon output, and to output data with password by registering such file and upon actual printing, inputting the password from a terminal for output instruction.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a timing chart showing a procedure for transmitting image data, inputted from various terminals, to a printer via the server, according to the embodiment;

FIG. 6 is a table showing a list of printer information;

FIG. 7 is a table showing job records;

FIG. 8 is an example of a job setting screen for a registered image, sent from the server to a terminal, according to the embodiment;

FIG. 9 is an example of a display screen showing the result of charge calculation for a job, sent from the server to the terminal, according to the embodiment;

FIG. 10 is an example of a display screen prompting a password, sent from the server to the terminal, according to the embodiment;

DETAILED DESCRIPTION OF THE PREFERRED EMBODIMENTS

Hereinbelow, an image data print system as a preferred embodiment of the present invention will be described in detail in accordance with the accompanying drawings. Note that in the present embodiment, the present invention will be described as a print system, however, the present invention is not limited to the print system. The invention is a technique for registration of data in a server and reading the registered data, therefore it is applicable to other systems, and the other systems are included in the invention.

<Configuration of Print System>

(Print System)

Figure 1:
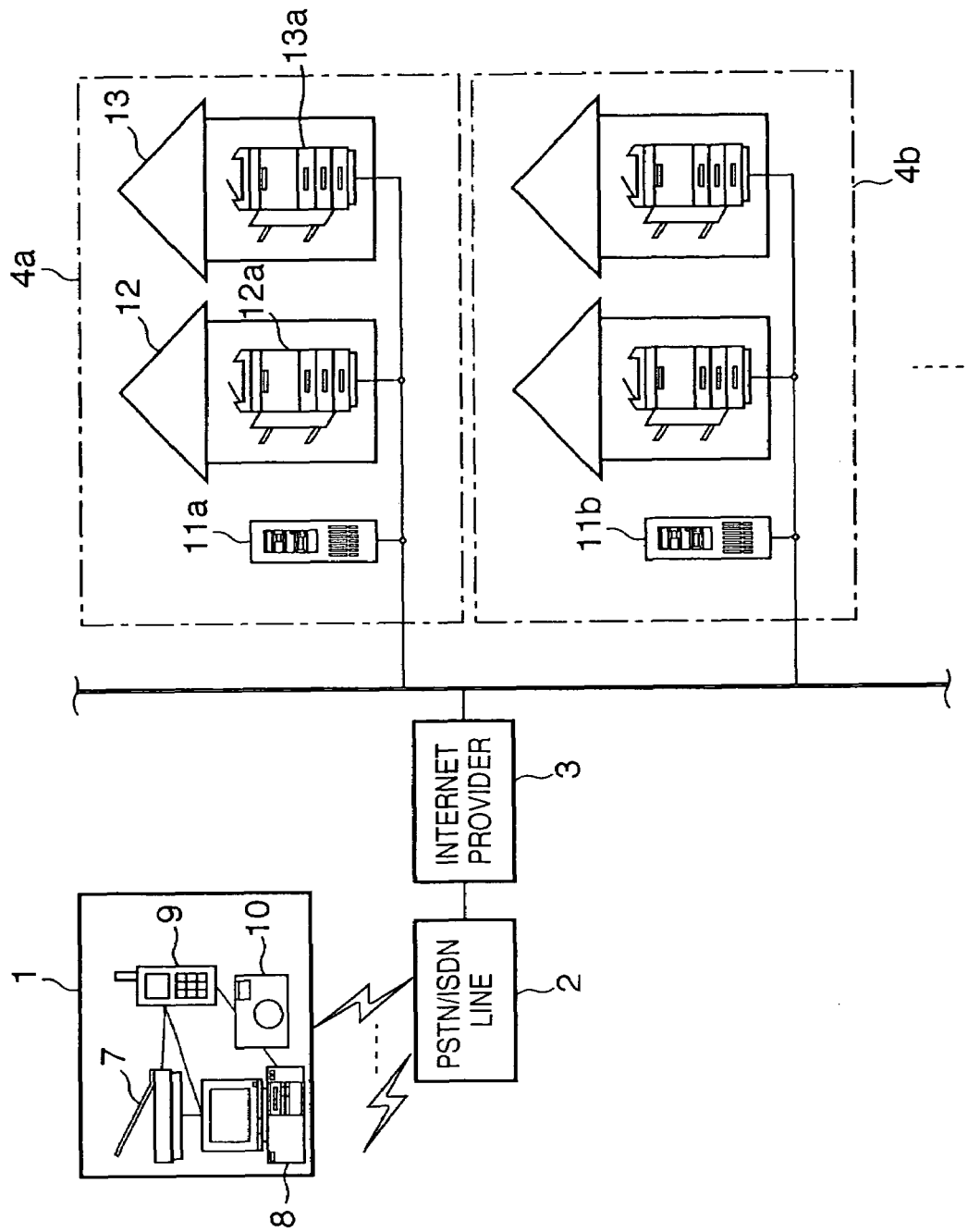
FIG. 1 illustrates the outline of a print system to print-output image data according to an embodiment of the present invention.

FIG. 1 illustrates the outline of a print system to print-output image data according to the present embodiment.

The print system is constructed with various terminals 1 (host computer or client computer) installed in houses and/or offices, which generate image data, a PSTN or ISDN public line 2, an Internet provider 3, and a printer group 4 (4a, 4b . . . ) including a server (print server) and plural printers provided in convenience stores and/or print shops.

Print subject data (hereinbelow, referred to as "image data". For example, the image data is a PDF file.) is sent through the public line 2 and via the Internet provider 3 and is stored in a server 11 (11a, 11b . . . ) in the printer group 4. A user calls data from the server 11, and obtains an output by a desired printer such as the printer 12a or 13a in the convenience store 12 or 13.

Each terminal 1 performs editing, combining and the like on an image file which has been generated by a personal computer 8 or read by a digital camera 10 or scanner 7, on the personal computer 8. The terminal 1 can transmit the image file, as a print job, onto the public line 2. Note that image data from the digital camera 10 or the scanner 7 may be transferred to the personal computer 8 via a mobile terminal 9 such as a PHS. Further, image data may be transmitted from a portable notebook personal computer as the personal computer 8 via such mobile terminal.

(Digital Multifunction Machine)

Figure 2:
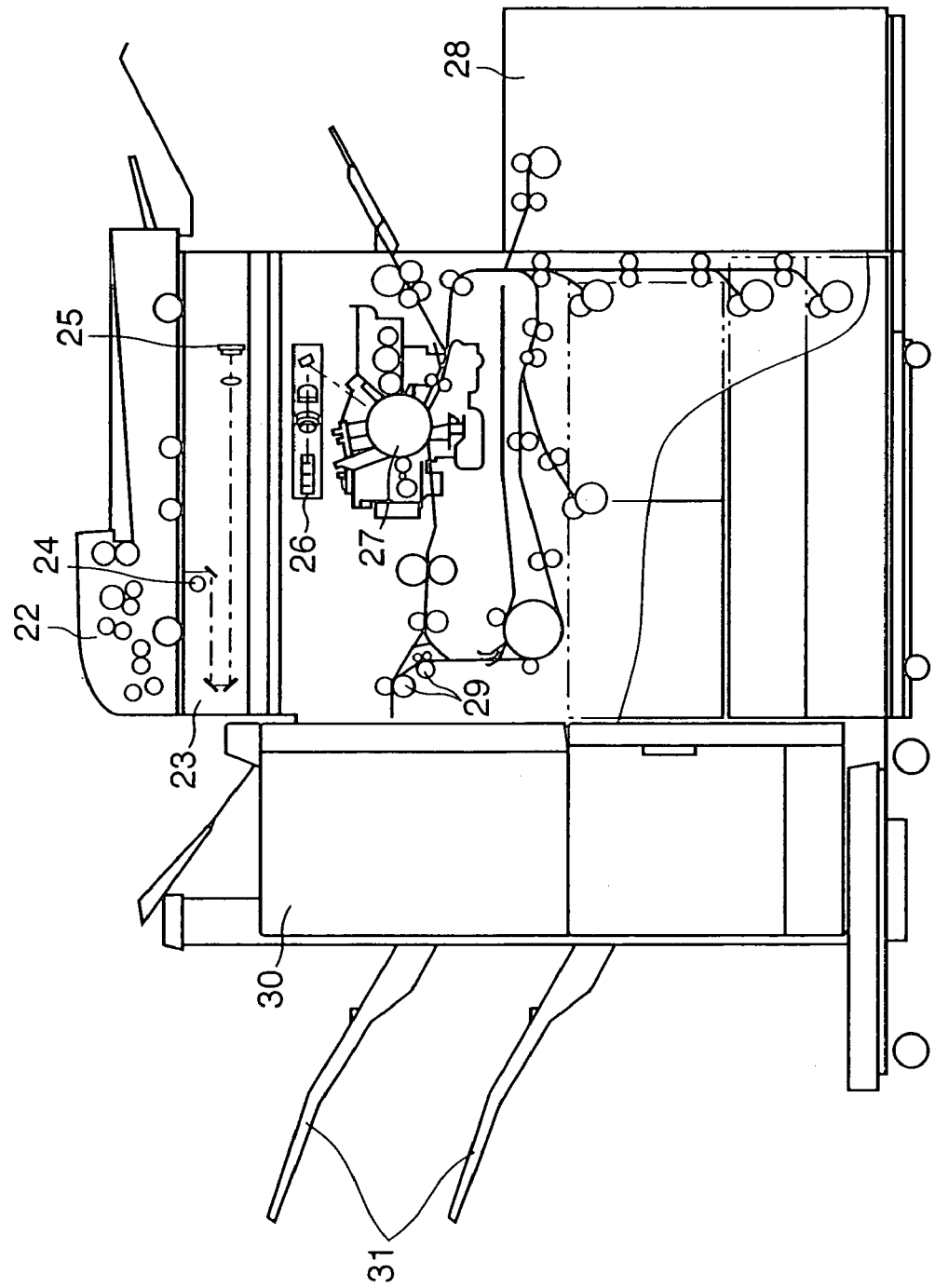
FIG. 2 is a cross-sectional view of a digital multifunction machine according to the embodiment.

The printer used in convenience stores and/or print shops is a digital multifunction machine as shown in FIG. 2.

The digital multifunction machine has respective functions of copier, printer and facsimile (hereinbelow "FAX") machines. FIG. 2 shows a cross-sectional view of the digital multifunction machine including a print engine 21 for monochrome printing and its accessories. When an original is set in face-up state on a document feeder (DF) 22 and a start key is depressed, the original is conveyed to an upper surface of an original reader 23. The original is irradiated with light from a light source 24, then the reflected light is read by a CCD 25 and converted to a digital signal. The signal is subjected to desired image processing and converted to a laser print signal.

The print signal is converted to print laser by a laser printing unit 26, then emitted to a photosensitive member 27, to form a latent image on the photosensitive member 27. Then toner development is performed, and the toner is transferred to a transfer sheet supplied from a paper cassette 28. The toner is fixed to the paper by a fixing unit 29, and discharged to a finisher 30.

The finisher 30 performs various operations in correspondence with a function designated by an operator. More particularly, the finisher 30 has a staple (1 position and two position) function, a punch (2 holes and 3 holes) function, and a binding (saddle-stitch binding and the like) function. Two paper discharge trays 31 can be selectively used for the respective copier, printer and FAX functions by the operator's setting. A print engine 1, which is for a monochrome printer here, may be a color printer engine. When the digital multifunction machine is used as a printer, the following functions may be set by a driver. For example, setting for monochrome/color printing, paper size, Nin1, double-sided, staple, punch, book binding, inserting paper, front cover, and back cover, can be made.

(Server)

Figure 3:
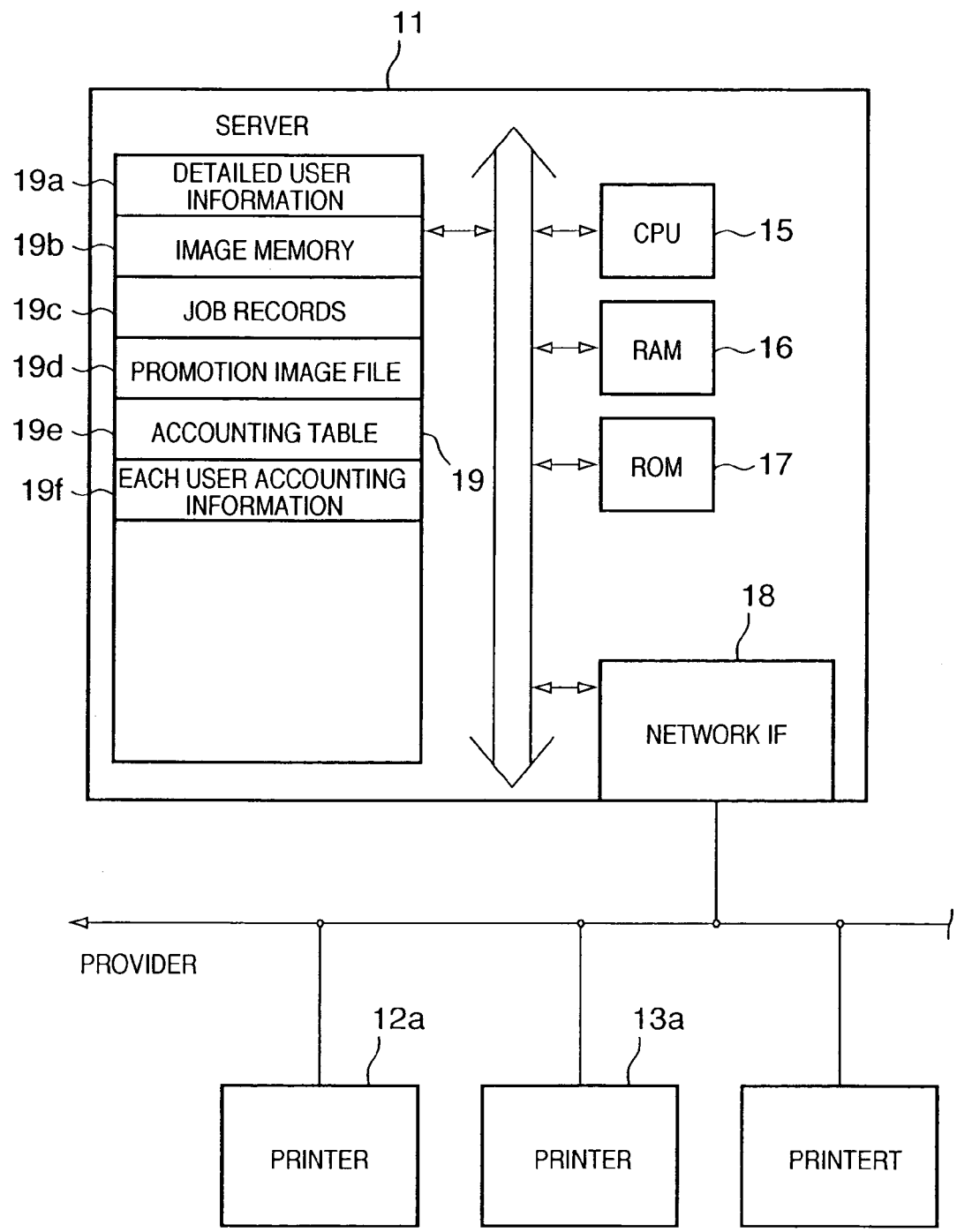
FIG. 3 is a block diagram showing the arrangement of a server and a printer group according to the embodiment.

FIG. 3 is a block diagram showing an example of the printer group 4 including the server 11 in FIG. 1.

The server 11 has a CPU 15, a RAM 16, a ROM 17, a hard disk 19, and a network interface (IF) 18. The server 11, which is an image server, also functions as a print server, and monitors the printers 12a and 13a respectively provided in the convenience stores 12 and 13. That is, the server 11 monitors information on printer functions and specification and statuses such as current printer use status, job status, and printer available/unavailable status.

When the power of the server 11 is turned ON, the server 11 inquires about various printer information managed by the server as a print server, as "Power ON-Time Inquiry Information 61" in FIG. 6, at the printers. Then information obtained from the printers 12a and 13a are stored via the network IF 18 into the RAM 16. When the powers of the printers are turned ON, the "Power-ON-Time Inquiry Information 61" is also obtained from the printers 12a and 13a.

Thereafter, the server 11 obtains the printer status information as shown in the "Power-ON-Time Inquiry Information 61" in FIG. 6 and stores the information into the RAM 16 by a predetermined (variable) period. The information acquisition may be made as polling from the server by predetermined time or transmission of status from the printers to the server by predetermined time.

The hard disk (HD) 19 of the server 11 holds various software to function as a print server and an image server. Further, the hard disk 19 holds information necessary for the print system. Next, a particular example of the stored data will be described.

In FIG. 3, in detailed user information 19a, the user's personal information such as address, telephone number, age, sex, and account number, is stored with a user ID.

In an image memory 19b, image data registered by users, image IDs and user IDs, respectively linked with each other, are registered.

As shown in FIG. 7, in job records 19c, the user IDs, the image IDs, and job IDs, respectively linked with each other, are registered. Further, the detailed content of job as shown in FIG. 9 is also linked with the job ID and stored as a job record.

A promotion image file 19d includes image data to be printed in blank space of print sheet. The data is used for reduction from a charge amount paid by a user at a print shop in accordance with the size of blank space and the number of print sheets.

An accounting table 19e holds a charge table based on paper size, color/monochrome printing, paper type, and function (staple, punch and the like). The charge of a job requested by a user is calculated in accordance with the table.

In user accounting information 19f, the user IDs and accounting information such as printers, payment amounts, and output dates are respectively linked with each other and stored. The data is used for calculation of monthly accounting by user, and also used for monthly sales accounting by printer.

<Operation Procedure of Print System>

Hereinbelow, an example of the operation in the print system having the above configuration will be described.

(Conception of Operation)

FIG. 5 is a timing chart showing the conception of operation procedure for transmission of image data inputted from the terminal 1 by a user to the printer via the server (image server) 11.

(i) The image server 11 inquires about the information and statuses as shown in FIG. 6 on the printer side.

(ii) The result of inquiry in (i) is returned from the printer to the image server 11. The image server 11 obtains the information such as functions, specifications and statuses of the plural printers managed by the server as a printer server (see FIG. 6).

(iii) The user edits image data inputted from the scanner and/or digital camera, and/or generated on the personal computer, then transmits the image data to the image server 11 to register the image data there. When the image data is registered in the image server 11, image IDs are set for the respective registered images. The image server 11 side manages the image IDs and image data respectively linked with each other (see the image memory 19b in FIG. 3).

(iv) When the image data has been registered, the image server 11 transmits a job setting screen for the registered images to the user terminal 1. For example, a setting screen as shown in FIG. 8 is transmitted. The user performs job setting in accordance with the setting screen. In the setting screen, the image ID is inputted. The user makes selections utilizing the setting screen for a function to be used.

(v) When the job setting using the job setting screen has been completed, the user sends the set job information to the image server 11 by clicking a transmission button.

(vi) The image server 11 receives the job in (v), then calculates a charge amount for the job and sends the result of calculation to the user terminal. For example, information checked on the user's personal computer is as shown in FIG. 9.

(vii) In consideration of the charge amount, the user gives approval of the job by depressing a print "OK" button in FIG. 9, and the result of selection is transmitted to the image server 11.

(viii) The image server 11 returns data, indicating that the job from the user has been received, as a job ticket. The job ticket includes the user ID, a job ID and a document ID.

(ix) If the once-received job is to be changed, the transmission data used in FIG. 9 is again used thereby the job can be changed. In FIG. 9, a job change "Yes" button is clicked and the data is transmitted to the image server 11. Then the image server 11 sends the setting screen as shown in FIG. 8 again. The user changes the job setting and transmits it.

(x) The image server 11 transmits the result of changed job setting and charge amount, similar to that shown in FIG. 9, to the user terminal.

(xi) The operation is the same as (vii)

(xii) The operation is the same as (viii)

(xiii) On the due date of printing, the image server 11 transmits the job ticket to the printer in preparation for printing. On the printer side, when the user inputs user authentication information such as the job ID and a password into the printer, printing becomes possible. The print output time is determined in accordance with determination of payment. That is, upon determination of payment by using a coin vendor, charging to the user's credit card, charging to a particular bank account, payment by electronic money, or the like, printing is started.

(xiv) When the printing has been completed, the printer sends information indicating the completion of printing to the image server 11.

(Flowchart in Image Server)

Figure 4A:
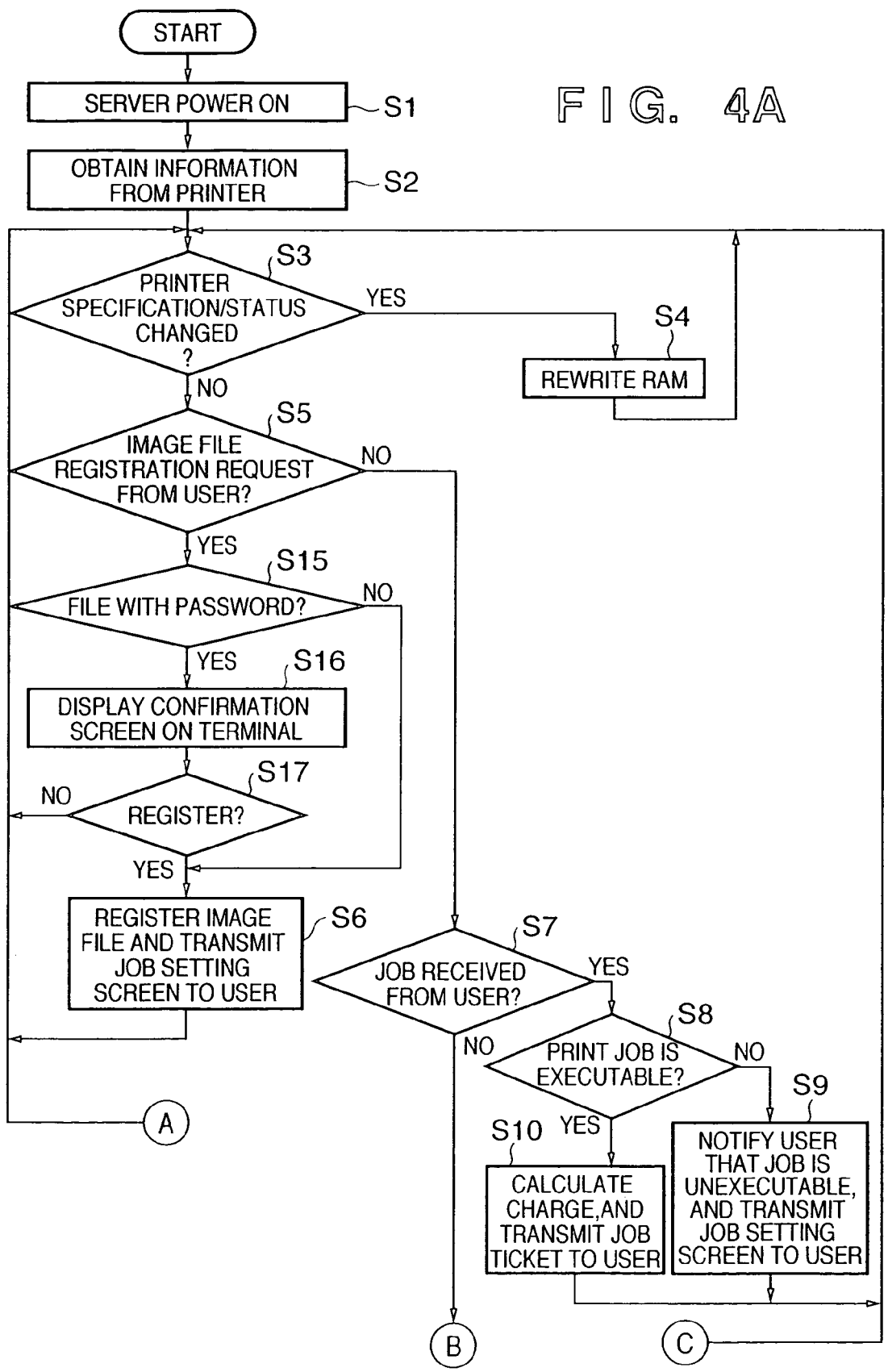
FIGS. 4A and 4B are flowcharts showing an operation procedure of the server according to the embodiment.
Figure 4B:
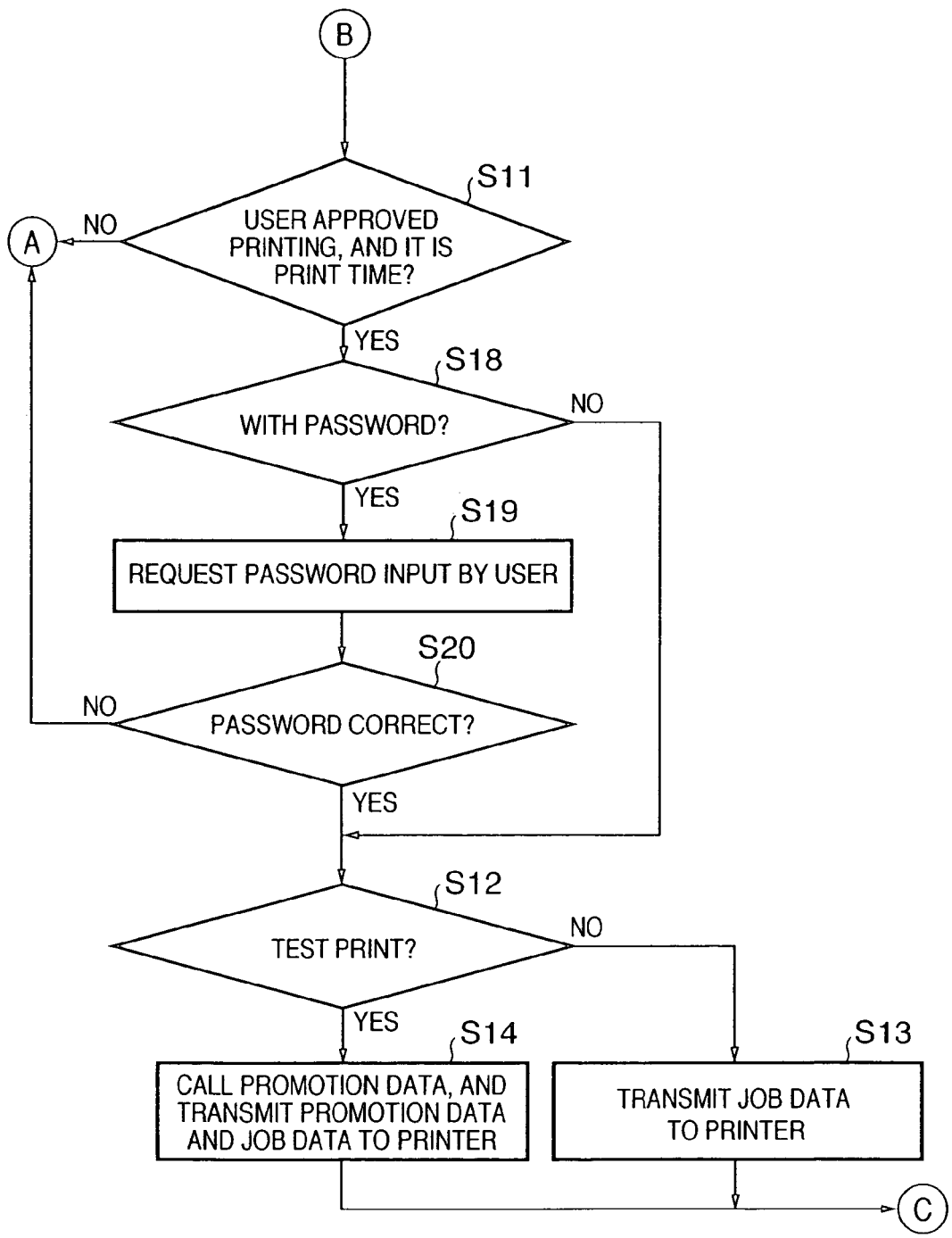

FIGS. 4A and 4B are flowcharts showing a procedure of processing upon power-ON of the image server 11, job reception and printing.

When the power of the image server 11 is turned ON (step S1), the server obtains the statuses and specification information from the printer, and writes the data into the RAM in the image server (step S2). The server always monitors whether or not the printer specification and statuses have been changed (step S3). When the printer specification and statuses have been changed, the image server rewrites the RAM in the server (step S4), and the process returns to step S3.

When the printer specification and statuses have not been changed, the image server 11 checks whether or not an image file registration request has been sent from a user (step S5). When an image registration request has been received, the image server 11 checks whether or not the data is a file with password (step S15). If it is not a file with password, the process proceeds to step S6, at which the image file is registered, with an image ID, in the image server, and a job setting screen is transmitted to the user's personal computer (step S6). Then the process returns to step S3. If it is determined at step S15 that the data is a file with password, the process proceeds to step S16, at which a screen asking whether or not the data is to be registered is displayed on the terminal. At step S17, if an instruction to register the data is returned from the terminal, the process returns to step S6. On the other hand, if an instruction not to register the data is returned from the terminal at step S17, the process returns to step S3.

Figure 14:
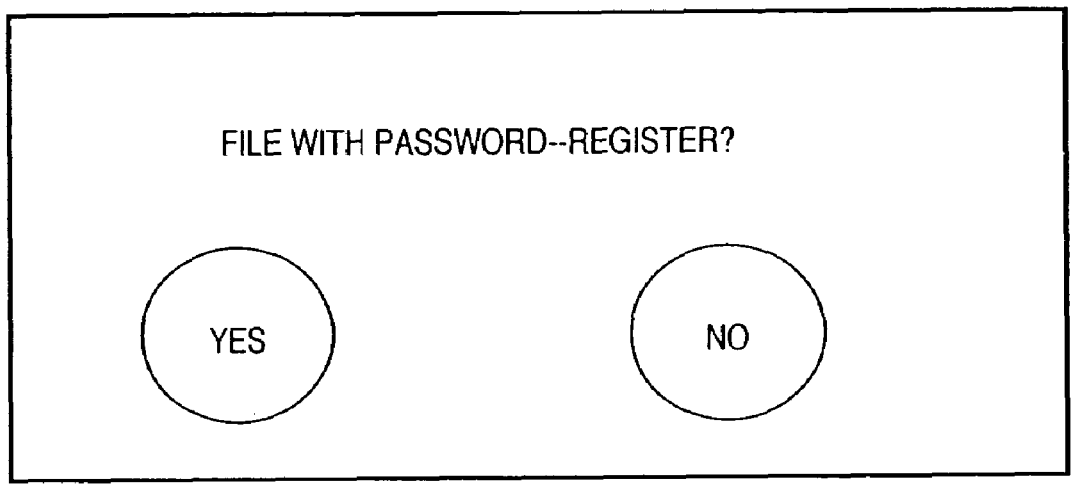
FIG. 14 is an example of a display screen for an inquiry upon registration of image data with password to the terminal, according to the embodiment.

FIG. 14 is an example of an inquiry screen for checking whether or not an image with password is to be registered, displayed at step S16.

If an image registration request has not been received, it is checked whether or not a job has been received from a user (step S7). When a job has been received, it is checked whether or not the print job is executable (step S8).

If the print job is not executable, information indicating that the job is unexecutable is transmitted to the user, and the job setting screen is sent to the user for re-setting of the job (step S9). On the other hand, if the print job is executable, the charge of the execution of the job is calculated. Then, a job ticket for checking the job setting including the calculated charge amount is transmitted to the user (step S10).

At step S7, when a job has been received, it is checked whether or not the user has approved printing and whether or not it is the print due date (step S11). If it is not the print due date, the process returns to step S3.

If it is the print due date, the process proceeds to step S18 at which it is determined whether or not the data to be outputted is data with password. If it is data without password, the process proceeds to step S12. On the other hand, if it is determined at step S18 that the data is data with password, a request for password input is sent to the terminal at step S19. Then at step S20, it is determined whether or not the input password is correct. If the password is wrong, the process returns to step S3.

If the password is correct, the process proceeds to step S12, at which it is checked whether or not the job is test printing. If it is determined that the job is test printing, promotion data is called from the promotion file, and the promotion data and the print job data are transmitted to the printer (step S14). If it is determined that the job is not test printing, the job data is transmitted to the printer (step S13).

At step S19, a password input screen as shown in FIG. 10 is displayed on the terminal. For document discrimination by the user, at least one of data name to be printed, server name holding the data, user name who registered the data, account name of data registration, date of registration, and time of registration, can be displayed on the terminal such that the user inputs a password in accordance-with the document.

<Operation of Print System>

(Registration without Password)

Figure 11:
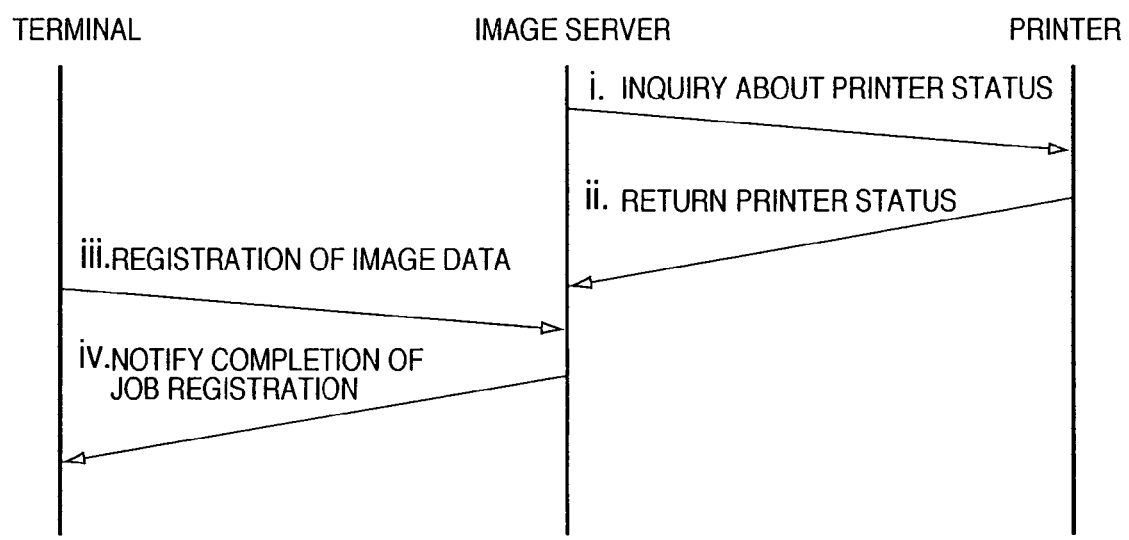
FIG. 11 is a timing chart showing a procedure for registration of image data without password according to the embodiment.

FIG. 11 is a timing chart showing the flow of registration of image data without password in the image server 11.

(i) The image server 11 inquires about the information and statuses as shown in FIG. 6 on the printer side.
(ii) The result of inquiry in (i) is returned from the printer to the image server 11. The image server 11 obtains the information such as functions, specifications and statuses of the plural printers managed by the server as a printer server (see FIG. 6).
(iii) The user edits image data inputted from the scanner and/or digital camera, and/or generated on the personal computer, then transmits the image data to the image server 11 to register the image data there. When the image data is registered in the image server 11, image IDs are set for the respective registered images. The image server 11 side manages the image IDs and image data respectively linked with each other (see the image memory in FIG. 3).
(iv) When the image data has been registered, it is determined whether or not a password is attached to the data. Since a password is not attached to the data, the job setting screen for the registered image is transmitted from the image server 11 side to the user terminal 1. For example, a setting screen as shown in FIG. 8 is sent. The user makes selections utilizing the setting screen for a function to be used.

(Registration With Password)

Figure 12:
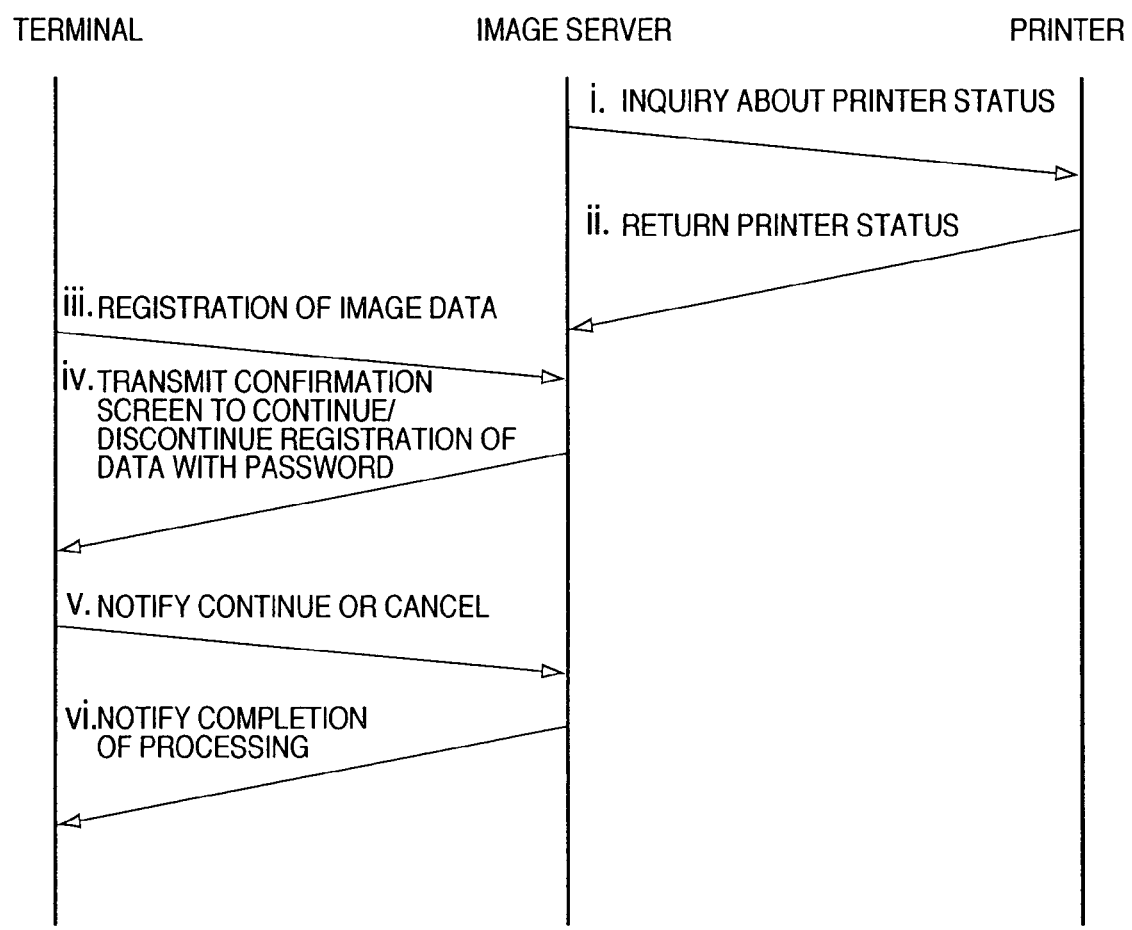
FIG. 12 is a timing chart showing a procedure for registration of image data with password according to the embodiment.

FIG. 12 is a timing chart showing the flow of registration of image data with password in the image server 11.

(i) The image server 11 inquires about the information and statuses as shown in FIG. 6 on the printer side.
(ii) The result of inquiry in (i) is returned from the printer to the image server 11. The image server 11 obtains the information such as functions, specifications and statuses of the plural printers managed by the server as a printer server (see FIG. 6).
(iii) The user edits image data inputted from the scanner and/or digital camera, and/or generated on the personal computer, then transmits the image data to the image server 11 to register the image data there. When the image data is registered in the image server 11, image IDs are set for the respective registered images. The image server 11 side manages the image IDs and image data respectively linked with each other (see the image memory in FIG. 3).
(iv) When the image data has been registered, it is determined whether or not a password is attached to the data. As a password is attached to the data, a screen for the user to determine whether or not the data is to be registered to the terminal 1. (see FIG. 14).
(v) The user of the terminal 1 notifies the image server 11 whether or not the data registration is to be continued.
(vi) If an instruction of registration has been received from the user, the job setting screen as shown in FIG. 8 is sent to the terminal.

(Output with Password)

Figure 13:
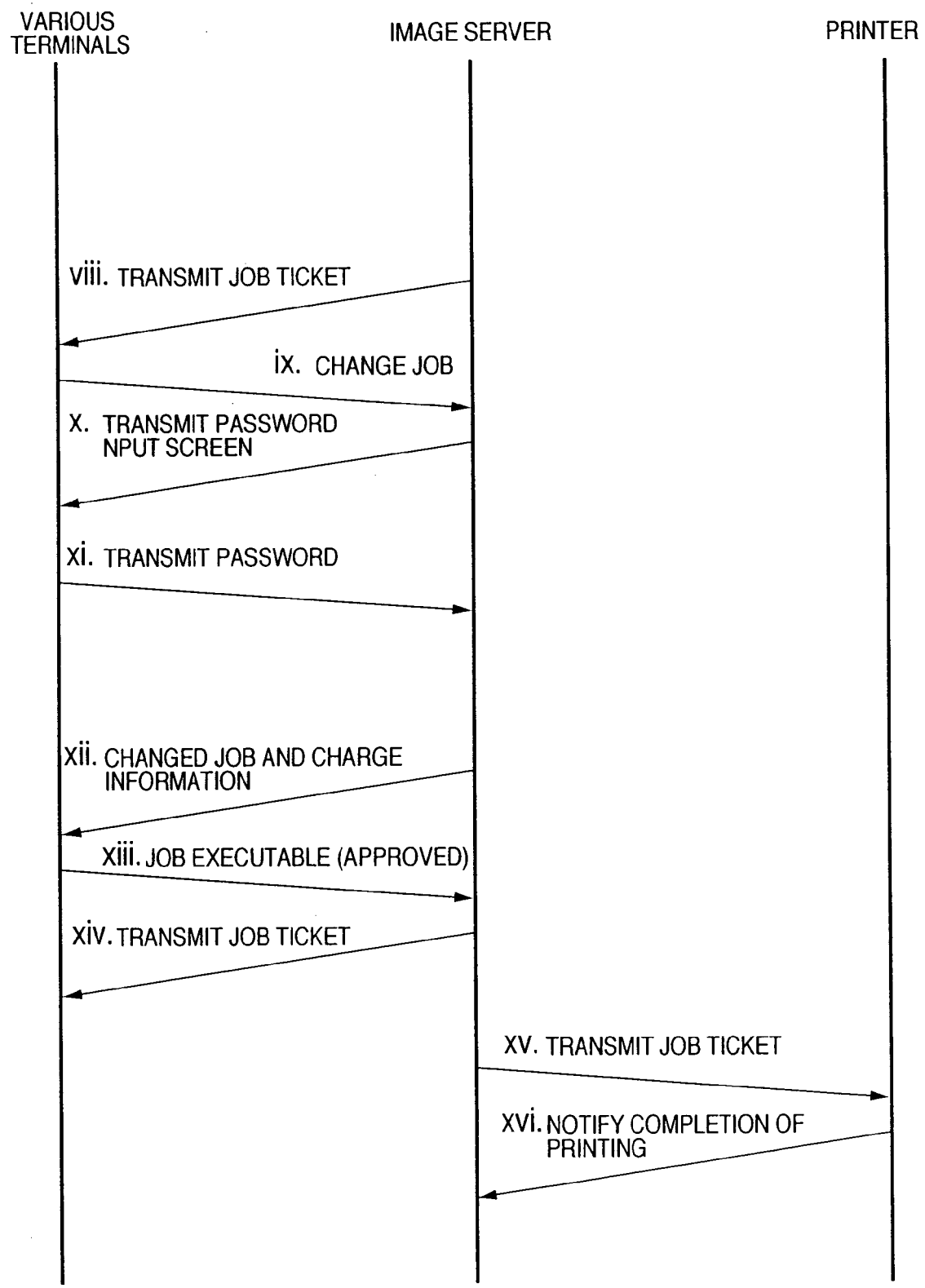
FIG. 13 is a timing chart showing a procedure printing image data with password according to the embodiment.

FIG. 13 is a timing chart showing the flow when output instruction is made to output image data with password.

(viii) The image server 11 returns data, upon reception of the job from the user, as a job ticket. The job ticket includes the user ID, a job ID and a document ID.
(ix) Upon job output, the job ticket is sent to the server, thereby the data is outputted from the image server 11. If the once-received job is to be changed, the job can be changed by re-utilizing the job ticket data and transmitting the job ticket to the image server 11.
(x) Since it is determined that a password is attached to the data, the image server 11 transmits a password input screen as shown in FIG. 10.
(xi) The user of the terminal 1 inputs a password and transmits the screen to the image server 11.
(xii) The image server 11 transmits the result of changed job setting and charge amount, similar to that shown in FIG. 9, to the user terminal.
(xiii) The operation is the same as (vii) in FIG. 5
(xiv) The operation is the same as (viii) in FIG. 5
(xv) On the due date of printing, the image server 11 transmits the job ticket to the printer in preparation for printing. On the printer side, when the user inputs user authentication information such as the job ID and the password into the printer, printing becomes possible. The print output time is determined in accordance with determination of payment. That is, upon determination of payment by using a coin vendor, charging to the user's credit card, charging to a particular bank account, payment by electronic money, or the like, printing is started.
(xvi) When the printing has been completed, the printer sends information indicating the completion of printing to the image server 11.

Note that in the present embodiment, the present invention is described as a print system, however, the present invention is not limited to the print system. The invention is a technique for registration of data in a server and reading the registered data, therefore it is applicable to other systems, and the other systems are included in the invention.

Further, the object of the present invention can also be achieved by providing a storage medium (or recording medium) holding software program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiment, and the storage medium holding the program code constitutes the invention. Furthermore, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

In a case where the present invention is applied to the aforesaid storage medium, the storage medium stores program code corresponding to the flowcharts described in the embodiment.

The present invention is not limited to the above embodiments and various changes and modifications can be made within the spirit and scope of the present invention. Therefore, to appraise the public of the scope of the present invention, the following claims are made.

CLAIM OF PRIORITY

This application claims priority from Japanese Patent Application No. 2004-221954 filed on Jul. 29, 2004, which is hereby incorporated by reference herein.

What is claimed is:

1. An information processing apparatus comprising:
receiving means for receiving data originating from a user;
first determination means for determining whether the data received by said receiving means is data with a password or data without a password;
notification means for sending to the user an inquiry screen inquiring of the user whether or not the user accepts to register data with a password, thereby to prevent undesired registration of data with a password, when said first determination means determines that the data received by said receiving means is data with a password; and
control means for registering the data with a password received by said receiving means in accordance with a registering instruction input by the user via the inquiry screen sent by said notification means.

2. The information processing apparatus according to claim 1, wherein said data includes image data.

3. The information processing apparatus according to claim 1, further comprising output means for outputting the registered data in response to a request of outputting the registered data.

4. The information processing apparatus according to claim 3, further comprising:
second determination means for determining whether the registered data is data with a password or data without a password, when a request of outputting the registered data is received from an output request side; and
request means for requesting password input to the output request side, when said second determination means determines that the registered data is data with a password.

5. The information processing apparatus according to claim 4, further comprising third determination means for determining whether or not a password inputted from the output request side is correct, and
wherein said output means continues output processing when a password inputted from the output request side is correct, while stops the output processing when the password is not correct.

6. The information processing apparatus according to claim 4 wherein said request means, when said second determination means determines that the registered data is data with a password displays at least one of name of the registered data to be outputted, name of server holding the registered data, name of user who registered the data, account name of data registration, date of registration, and time of registration, on the output request side, and then enables the password input from the output request side.

7. The information processing apparatus according to claim 1, wherein said control means further sends to the user a setting screen from which the user sets print setting information of the data with a password.

8. An information processing method comprising:
a receiving step of receiving data originating from a user at an information processing apparatus;
a first determination step of using the information processing apparatus to determine whether the data received in said receiving step is data with a password or data without a password;
a notification step of sending the user an inquiry screen inquiring of the user whether or not the user accepts to register data with a password, thereby to prevent undesired registration of data with a password, when it is determined in said first determination step that the data received in said receiving step is data with a password; and
a control step for registering data with a password received in said receiving step in accordance with a registering instruction input by the user via the inquiry screen sent in said notification step.

9. The information processing apparatus according to claim 8, wherein in said control step, a setting screen is further sent to the user, from which the user sets print setting information of the data with a password.

10. A computer-readable storage medium storing a computer-executable program causing a computer to execute an information processing method, said program comprising:
a receiving step of receiving data originating from a user:
a first determination step of determining whether the data received in said receiving step is data with a password or data without a password;
a notification step of sending to the user an inquiry screen inquiring of the user whether or not the user accepts to register data with a password, thereby to prevent undesired registration of data with a password, when it is determined in said first determination step that the data received in said receiving step is data with a password; and
a control step for registering the data with a password received in said receiving step in accordance with a registering instruction input by the user via the inquiry screen sent in said notification step.

11. The computer-readable storage medium according to claim 10 wherein in said control step, a setting screen is further sent to the user, from which the user sets print setting information of the data with a password.

12. An information processing apparatus comprising:
a memory storing promotion data;
receiving means for receiving data;
determination means for determining whether or not test printing instruction is included in the data received by said receiving means; and
sending means for sending print data to a printer, wherein the print data is for printing the data received by said receiving means and the promotion data stored in the memory, and wherein the print data is sent to the printer when said determination means determines that test printing instruction is included in the data received by said receiving means.

13. An information processing method in an information processing apparatus having a memory storing promotion data, comprising:
- a receiving step of using the information processing apparatus to receive data;
- a determination step of determining whether or not test printing instruction is included in the data received in said receiving step; and
- a sending step of sending print data from the information processing apparatus to a printer, herein the print data is for printing the data received in said receiving step and the promotion data is stored in the memory, and wherein the print data is sent to the printer when it is determined in said determination step that test printing instruction is included in the data received in said receiving step.

14. A computer-readable storage medium storing a computer-executable program causing a computer to execute an information processing method in an information processing apparatus having a memory storing promotion data, said program comprising:
- a receiving step for receiving data;
- a determination step for determining whether or not test printing instruction is included in the data received in said receiving step; and
- a sending step for sending print data to a printer, wherein the print data is for printing the data received in said receiving step and the promotion data stored in the memory, and wherein the print data is sent to the printer when said determination step determines that test printing instruction is included in the data received in said receiving step.

* * * * *